United States Patent [19]

Emming

[11] 4,210,176
[45] Jul. 1, 1980

[54] HYDRAULIC LIQUID RESERVOIR WITH INTERNAL BAFFLE

[75] Inventor: Joseph L. Emming, Wichita, Kans.

[73] Assignee: J. I. Case Company, Racine, Wis.

[21] Appl. No.: 942,325

[22] Filed: Sep. 14, 1978

[51] Int. Cl.² .............................................. F16K 24/00
[52] U.S. Cl. ................................... 137/573; 137/574; 137/587; 55/193
[58] Field of Search ............... 137/571, 573, 574, 576, 137/587, 262, 265; 220/22; 55/182, 192, 193

[56] References Cited

U.S. PATENT DOCUMENTS

| | | | |
|---|---|---|---|
| 699,281 | 5/1902 | Baylis | 137/576 |
| 1,350,715 | 8/1920 | O'Conner | 137/576 |
| 1,667,139 | 4/1928 | Border | 55/193 |
| 2,047,539 | 7/1936 | Wolf | 137/573 |
| 2,570,171 | 10/1951 | Kohorn et al. | 55/193 |
| 2,595,743 | 5/1952 | Young | 137/265 |
| 2,703,607 | 3/1955 | Simmonds | 137/265 |
| 3,642,086 | 2/1972 | Andrews | 220/22 |
| 3,858,642 | 1/1975 | Battison et al. | 137/573 |

FOREIGN PATENT DOCUMENTS 522918 7/1940 United Kingdom ..................... 55/192

Primary Examiner—Martin P. Schwadron
Assistant Examiner—A. Michael Chambers
Attorney, Agent, or Firm—Dressler, Goldsmith, Shore, Sutker & Milnamow, Ltd.

[57] ABSTRACT

A hydraulic liquid reservoir includes a tank that has a plurality of walls and a baffle structure which divides the inside of the tank into three compartments. An inlet is connected to one lower compartment while an outlet is connected to the second lower compartment and a third upper compartment is interconnected with both the first and second lower compartments at a location below the liquid level in the tank. The baffle structure is designed such that there are high points in each the first and second compartments which are in communication with the inside of the tank above the liquid level in the third compartment to vent any air from the first and second compartments into the top of the tank within the third compartment.

12 Claims, 2 Drawing Figures

HYDRAULIC LIQUID RESERVOIR WITH INTERNAL BAFFLE

BACKGROUND OF THE INVENTION

The present invention relates generally to hydraulic systems for supplying fluid to a plurality of fluid operated devices and more particularly to a hydraulic liquid reservoir from which hydraulic fluid is withdrawn through a pump and delivered to a fluid operated device and then is returned to the reservoir.

Many vehicles and implements now utilize a hydraulic system as the major power source for operating any number of devices associated with the vehicle. For example, in industrial earthworking equipment, a plurality of fluid rams are utilized for manipulating various components of various earthworking implements and the fluid rams are supplied with pressurized fluid through a pump that withdraws fluid from a reservoir. In order to simplify the hydraulic control circuit in many of the smaller units, such units employ what is commonly termed an open-center system wherein the valves that control the fluid to and from the various fluid rams allow the pressurized fluid to pass through the associated valve when the valve is in a neutral condition which is then returned to the reservoir.

With this type of hydraulic system, it is customary to utilize a constant flow pump and have all of the output of the pump bypass either through the valve or through a bypass system and returned to the reservoir when none of the fluid rams associated therewith are being actuated. Also, in order to provide a system at reduced cost, normally a single pump supplies pressurized fluid to a plurality of valves which are respectively connected to a plurality of fluid rams. Thus, when any of the valves are moved to an operative position, pressurized fluid is delivered to the associated fluid ram. Under these circumstances, it is necessary for the pump to have a substantially high capacity of hydraulic liquid in order to supply all of the fluid rams simultaneously, should such a need arise.

With such high output pumps, difficulties have been encountered in creating turbulence within the reservoir as the hydraulic fluid or liquid is being returned to the reservoir either directly from the pump or after it has been diverted through the respective fluid rams. This turbulent condition results in creating air bubbles in the hydraulic liquid or oil within the reservoir which are difficult to remove and result in reducing the output of the pump and can also result in cavitation of the pump should the aeration become excessive.

Various proposals have been made for reducing the aeration of the hydraulic oil within the reservoir and one such proposal consists of a baffle located between the reservoir inlet and the reservoir outlet. Other proposals have been suggested such as disclosed in U.S. Pat. No. 3,002,355, which proposes a substantially closed passage between the inlet pipe of the tank and the outlet. However, such a proposed system has inherent shortcomings in that the dwell time of the hydraulic liquid that is being returned to the reservoir is at a minimum because it is substantially entrapped under the member that defines the passage which prevents mixture of the return oil with the remaining oil for cooling purposes.

SUMMARY OF THE INVENTION

According to the present invention, a hydraulic liquid reservoir includes a baffle design which allows for maximum dwell time of the hydraulic liquid within the reservoir and at the same time maximizes de-aeration of the hydraulic oil as well as producing a good mixing of the return oil with the remainder of the oil in the reservoir.

According to the present invention, the baffle design within the tank consists of a divider member extending upwardly from a bottom wall of the tank and terminating at a location spaced from the top wall with first and second baffle members secured to the upper free edge of the divider member which respectively extend toward opposite sides of the tank to define first and second separate lower compartments adjacent the lower end of the tank. Both of these compartments communicate with a third upper compartment defined in the upper portion of the tank. Both lower compartments are also vented through vent means leading from each compartment to an area adjacent the top wall of the tank above the normal liquid level within the tank. The hydraulic liquid inlet is located in one of the lower compartments while the hydraulic liquid outlet is located in the other of the compartments so that hydraulic oil must be received into the first compartment, where de-aeration takes place, then passes through the opening means into the upper or third compartment where further de-aeration can take place and subsequently enter the third compartment where additional de-aeration takes place before the oil enters the outlet to the pump.

More specifically, the first and second baffle members define covers for the first and second compartments and are generally flat while sloping downwardly towards the bottom wall of the tank in the direction away from the divider member so that the highest point in the compartment is located adjacent the divider member. A single vent tube is connected to the top of the baffle structure and is in communication at its lower end with both of the first and second compartments while the upper end is located above the normal liquid level within the tank. The opening means between the compartments are located adjacent the sidewalls of the tank, which is preferably rectangular, so that the hydraulic oil leaving the first compartment must pass across the entire distance between the opposed sidewalls of the tank within the third compartment before it can enter into the second or outlet compartment.

With the above baffle design, the vent means for the lower compartments or chambers are located above the liquid flow path outlets for the chambers and are located adjacent a "dead" space within the compartment thereby allowing any air bubbles within the hydraulic oil to migrate towards this "dead" space and then pass through the open vent tube into the air space above the normal liquid level within the tank. After the hydraulic oil leaves the first compartment, it must pass and mix with the hydraulic oil in the upper compartment to produce a greater cooling effect and at the same time allow any air bubbles therein to rise to the liquid surface. Further aeration also takes place within the third compartment since the highest point of this compartment is again a "dead" corner at the upper end of the compartment where the lighter air bubbles will tend to be directed.

DETAILED DESCRIPTION OF THE PREFERRED EMBODIMENT

Figure 1:
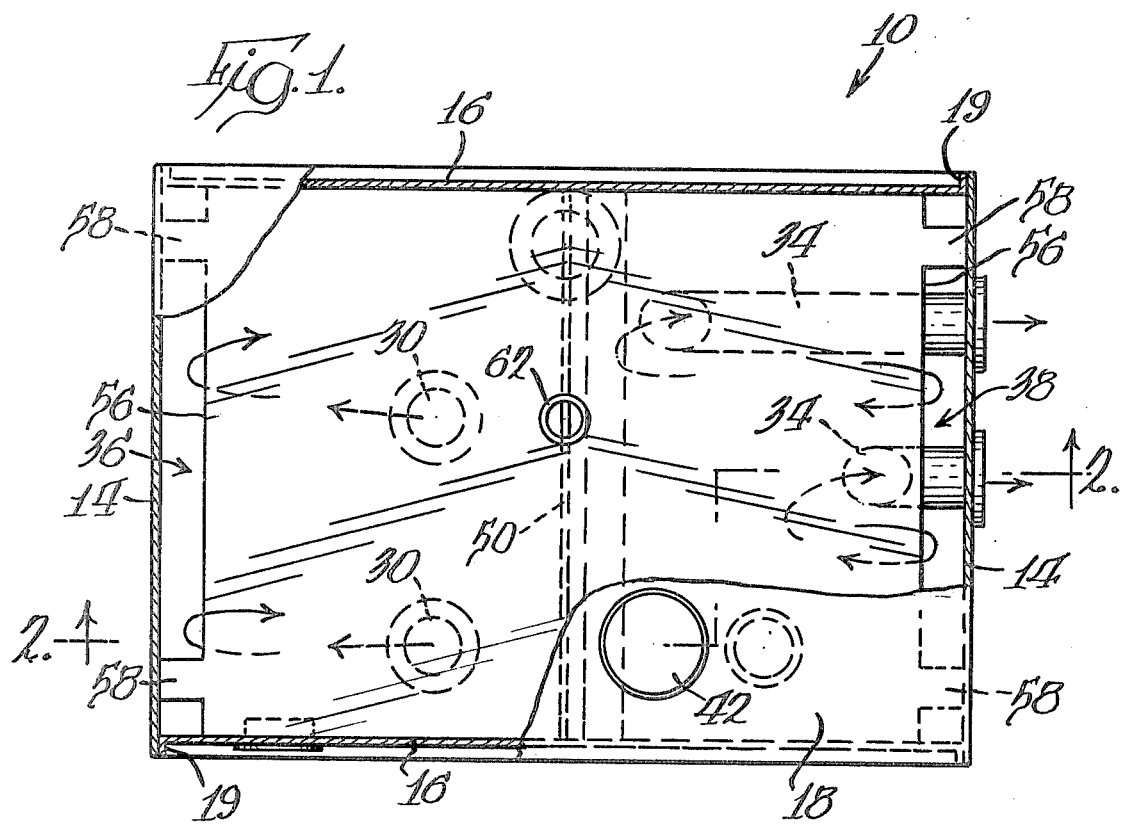
FIG. 1 is a plan view, partly in section, of a hydraulic liquid reservoir having the baffle structure of the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a hydraulic liquid reservoir generally designated by reference numeral 10 which has the baffle structure of the present invention incorporated therein. Reservoir or tank 10 includes a substantially flat bottom wall 12, a first pair of opposed vertical sidewalls 14 extending from the periphery of bottom wall 12, a second pair of vertical sidewalls 16 extending from the remaining peripheral edges of the rectangular bottom wall 12 and a generally rectangular top wall 18. In the illustrated embodiment, tank 10 has bottom wall 12, sidewalls 14 and top wall 18 formed as an integral piece of material, such as sheet metal, which defines a substantially rectangular opening therein. The opposite ends of the rectangular opening are closed by substantially rectangular members that form the sidewalls 16 which may have peripheral flanges 19 that are welded directly to the peripheral edge of the rectangular shell.

Figure 2:
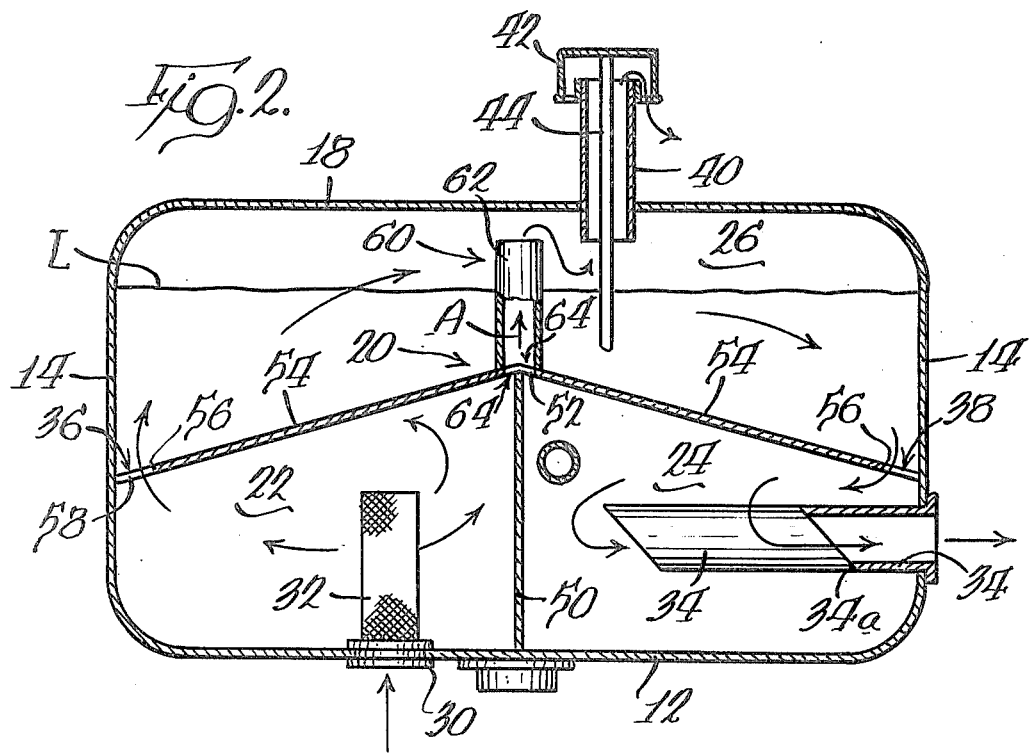
FIG. 2 is a vertical section as viewed generally along line 2—2 of FIG. 1.

The rectangular interior of tank 10 has a baffle structure or means 20 which divides the tank into first and second lower compartments 22 and 24 and an upper compartment 26. As illustrated in FIG. 2, one or more inlets 30 are defined in bottom wall 12 into the first lower compartment 22 and inlet means 30 may have a diffuser and strainer screen 32 located thereon to diffuse the hydraulic oil entering compartment 22. One or more outlet means 34 are located within second lower compartment 24 while the first lower compartment 22 is in communication with upper compartment 26 through first opening means 36 and the second lower compartment 24 is in communication with upper compartment 26 through second opening means 38.

Reservoir or tank 10 also has a filler pipe 40 extending through the top wall 18 and filler pipe 40 may have a breather cap 42 supported thereon so that the air space within upper compartment 26 above the normal liquid level L is vented to the atmosphere. If desired, breather 42 may also have a dip stick 44 associated therewith so that the liquid level can readily be measured and maintained at the normal level L.

The baffle structure of the present invention is most clearly illustrated in FIG. 2 and consists of a divider member 50 which has its lower edge welded to bottom wall 12 and extends between opposed vertical sidewalls 16 to define the inner wall for both compartments 22 and 24. The upper edge 52 of divider member 50 extends generally parallel to bottom wall 12 and top wall 18 and is located a substantial distance from top wall 18 and also below the normal liquid level L within the tank. Baffle structure or means 20 also includes first and second baffle members 54 which extend from the upper free edge 52 of divider member 50 being welded to the edge and extend towards opposed sidewalls 14 of tank 10. Each baffle member 54 is flat and has a major portion of an outer edge 56 spaced from the adjacent sidewall 14 to define the respective first and second opening means 36 and 38 which are, therefore, located adjacent opposed peripheral portions of the periphery of reservoir 10. Stated another way, the flat plates 54 have edges 56 that are spaced from the adjacent sidewalls 54 and have integral extensions 58 that may be welded to sidewalls 14 for connecting the respective plates to the respective sidewalls 14.

As most clearly illustrated in FIG. 2, first and second flat baffle members 54 respectively slope from upper edge 52 away from top wall 18 and towards bottom wall 12 so as to define an inclined cover for each compartment 22 and 24 the highest point for which is located at the juncture between plates 54 and divider member 50. Also, the opening means 36 and 38 which are located adjacent the respective opposed sides 14 of the reservoir or tank are located substantialy below the highest point within each compartment, which is located within the center of tank 10.

Vent means 60 extend from each lower compartment 22 and 24 to a location adjacent top wall 18 with the outlet for vent means being located above the normal liquid level L within tank 10. In the illustrated embodiment, vent means 60 is in the form of a single vent tube 62 which is centered on the upper edge of divider member 50 and is located in close proximity to the center of the tank. The lower end of vent tube 62 is in communication with both compartments 22 and 24 through openings 64 which lead from the highest point of each lower compartment that is closest to the top wall 18.

To state another way, the respective opening means or hydraulic liquid flow paths 36 and 38 are located below the vent openings 64 so that the vent openings 64 are spaced a greater distance from bottom wall 12 than opening means or flow paths 36 and 38.

With the arrangement so far described, hydraulic liquid oil is returned from the fluid rams (not shown) through inlet opening 30 and the hydraulic oil is diffused through diffuser 32. Since the inlet opening is spaced inwardly a substantial distance from flow path 36, and is normally directed upwardly, the oil flows under the tent-shaped baffle 54 which allows for any air bubbles to settle out and migrate towards the uppermost point within the chamber 22 and exit through vent opening 64 and vent tube 62 to the top of the tank within upper compartment 26. Thus, this relatively "dead" upper corner adjacent vent opening 64 assures that any air that tends to migrate to a highest point within a chamber will be vented directly to the atmosphere. This prevents any air bubbles from being trapped within the chamber and subsequently picked up by the oil for travel therewith. Since the only opening from compartment 22 is located adjacent the periphery of tank 10 adjacent sidewall 14, the oil must change directions and travel downwardly along the tent-shaped baffle 54 to further insure that any bubbles trapped therein will tend to separate therefrom. The oil flowing through flow path 36 enters upper chamber 26 at one extreme end thereof and must pass across the entire distance of chamber 26 between walls 14 before it can flow through flow path 38. During the migration of the oil from one extreme side of the tank to the other, further de-aeration may take place since the bubbles will again have a tendency to migrate to the surface level L of the liquid within the tank. Also, the movement of the oil across the entire width of the tank insures that there is a maximum mixture of the oil within the reservoir with the oil that has just been received through the inlet opening 30 thereby insuring a proper mixture of the possibly hotter oil with the remaining oil within the reservoir.

Since the various outlet ports 34 are directed towards the center of compartment 24 and also have inlets 34a which are tapered towards the bottom wall 12, all oil flowing through hydraulic port 38 must flow towards divider wall 50 which provides for further de-aeration of the oil so that any bubbles remaining therein will have a tendency to migrate towards the top "dead" space located adjacent vent opening 64 and travel through the vent tube 62.

Summarizing the above, the baffle structure of the present invention maximizes the time that the oil is within the reservoir which allows for the use of smaller capacity reservoirs while still retaining proper de-aeration of the hydraulic liquid. This is accomplished through an extremely simple construction which can readily be incorporated into existing tank designs without any major modification.

Of course, numerous modifications come to mind without departing from the spirit of the invention. The "dead" space within the lower compartments could be further confined by having the upper edge 52 of divider member or wall 50 have a high point located adjacent tube 62 and taper downwardly towards bottom wall 12 from tube 62 towards opposite sidewalls 16. Also, the highest point for compartments 22 and 24 need not be located centrally of a tank as described above and baffle plates 54 could be configured so that the high points would be located intermediate opposed edges thereof which would require separate vent tubes for each compartment. In addition, upper compartment 26 could be divided into further compartments so as to increase the dwell time for the hydraulic liquid within the tank.

What is claimed is:

1. A hydraulic liquid reservoir comprising a tank having a substantially flat bottom wall, sidewalls and a top wall with a baffle structure within said tank, said baffle structure including a divider member extending vertically from said bottom wall and terminating at its upper edge spaced from said top wall, first and second baffle members extending downwardly from said upper edge toward adjacent sides of said bottom wall of said tank to divide a lower portion of said tank into first and second substantially closed compartments, a respective inlet and outlet in one of said compartments, opening means in each baffle member defining a hydraulic liquid flow path joining said compartments and an upper portion of the tank whereby hydraulic fluid traversing said reservoir follows a path including horizontal and vertical direction changes, and vent means extending from the upper portion of each compartment to a location adjacent said top wall, said vent means being spaced a greater distance from said bottom wall than said opening means and in communication with both of said compartments so that air in either of said compartments will be vented to the top of said tank without entering the liquid in said upper portion of said tank.

2. A hydraulic fluid reservoir as defined in claim 1, in which said sidewalls define a generally rectangular tank structure, said divider member extending between a first pair of opposed sidewalls, and said first and second baffle members respectively extending downwardly from said divider member toward the remaining pair of opposed sidewalls.

3. A hydraulic fluid reservoir as defined in claim 2, in which said first and second baffle members are generally flat and respectively slope from said upper edge toward said bottom wall with said vent means being located adjacent the juncture between said first and second baffle members and said divider member.

4. A hydraulic fluid reservoir as defined in claim 3, in which said opening means in said baffle members are respectively located adjacent the remaining sidewalls.

5. A hydraulic fluid reservoir as defined in claim 4, in which said divider member is substantially equally spaced from the remaining sidewalls so that said compartments are substantially equal in size.

6. A hydraulic fluid reservoir as defined in claim 4, in which said baffle members have slots adjacent each of the remaining sidewalls to define said opening means.

7. A hydraulic fluid reservoir as defined in claim 1, further including hydraulic fluid inlet means leading to said first compartment and hydraulic fluid exit means leading from said second compartment, said inlet and exit means being located below said opening means and said vent means.

8. In a hydraulic liquid reservoir defined by walls having an inlet and an outlet and baffle means, within said reservoir, for dividing said reservoir into: first and second lower compartments located entirely below a normal hydraulic liquid level within the reservoir; and an uppr compartment between said first and second lower compartments and a top wall of said reservoir, said inlet being located in said first lower compartment and said outlet being located in said second lower compartment, first and second opening means respectively between the first and second lower compartments and said upper compartment, said opening means being respectively located adjacent opposed walls on the periphery of said reservoir, the improvement comprising vent means leading from a point of each lower compartment closest to said top wall to a location above the normal hydraulic liquid level in the reservoir, said points for each compartment being located closer to said top wall than the respective opening means whereby air venting from said first and second lower compartments is isolated from the liquid in said upper compartment.

9. In a hydraulic liquid reservoir including: a tank defined by walls including a bottom wall, said bottom wall having an inlet and an outlet; and baffle means within said tank between said inlet and said outlet, the improvement of said baffle means including: a divider member extending upwardly from said bottom wall to divide a bottom portion of said tank into first and second compartments; said inlet and outlet being respectively located in one of said compartments, first and second baffle members secured to free edge of said divider member and respectively extending towards opposed sides of said tank to define covers for said compartments, said baffle members sloping downwardly towards said bottom wall and having portions thereof spaced from the respective opposed sides to define opening for a hydraulic flow path between the respective compartments and the remainder of the tank; and vent means leading from the juncture between the divider member and the respective baffle members towards the top of the tank to vent any air from the compartments to a level above a normal hydraulic liquid level in the tank.

10. A hydraulic liquid reservoir as defined in claim 9, in which
said bottom wall is rectangular and generally flat with four vertical sides extending from the periphery thereof and with a top wall interconnecting the upper edges of said sides and in which
said vent means includes at least one tube leading from the compartments, said tube terminating adjacent said top wall inside the tank.

11. A hydraulic liquid reservoir as defined in claim 10, in which said tube is centered on said free edge and is in communication with both said compartments at an uppermost point of each compartment.

12. A hydraulic liquid reservoir as defined in claim 11, in which said baffle members are flat plates having free edges respectively spaced from said opposed sides, said free edges of said plates having spaced integral extensions for connecting said plates to said opposed sides.

* * * * *